(12) United States Patent
Kim et al.

(10) Patent No.: US 8,134,808 B2
(45) Date of Patent: Mar. 13, 2012

(54) HARD DISK DRIVE

(75) Inventors: Woo Chul Kim, Suwon-si (KR); Chul Woo Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 12/757,473

(22) Filed: Apr. 9, 2010

(65) Prior Publication Data

US 2010/0259853 A1 Oct. 14, 2010

(30) Foreign Application Priority Data

Apr. 13, 2009 (KR) ........................ 10-2009-0031951

(51) Int. Cl.
*G11B 21/02* (2006.01)

(52) U.S. Cl. .................................... 360/264.7
(58) Field of Classification Search ................ 360/264.7
See application file for complete search history.

(56) References Cited

U.S. PATENT DOCUMENTS

| | | | |
|---|---|---|---|
| 6,181,530 B1 * | 1/2001 | Ratliff et al. | 360/265.8 |
| 6,252,746 B1 * | 6/2001 | Cho | 360/265.8 |
| 6,429,999 B1 * | 8/2002 | Dague et al. | 360/97.01 |
| 7,372,670 B1 * | 5/2008 | Oveyssi | 360/264.7 |
| 7,587,808 B2 * | 9/2009 | Kim et al. | 29/603.03 |

FOREIGN PATENT DOCUMENTS

| | | |
|---|---|---|
| JP | 3-273856 A | 12/1991 |
| JP | 5-41044 A | 2/1993 |
| JP | 2000-105984 A | 4/2000 |
| JP | 2000-184679 A | 6/2000 |

* cited by examiner

*Primary Examiner* — Mark Blouin
(74) *Attorney, Agent, or Firm* — Sughrue Mion, PLLC (57) ABSTRACT

A hard disk drive includes a head stack assembly including an actuator arm, a voice coil coupled to a bobbin, and a pivot shaft holder, rotatably coupled to a pivot shaft, disposed between the actuator arm and the voice coil. The hard disk drive also includes at least one magnet, disposed adjacent to the voice coil, which interacts and with the voice coil when current flows in the voice coil, thus generating an electromagnetic force to pivot the actuator arm around the pivot shaft, and a flux fringe prevention layer comprising a magnetic material and coupled to the voice coil, to prevent magnetic flux generated in the magnet being bent in the voice coil.

11 Claims, 10 Drawing Sheets

HARD DISK DRIVE

CROSS-REFERENCE TO RELATED PATENT APPLICATIONS

This application claims priority from Korean Patent Application No. 10-2009-0031951, filed on Apr. 13, 2009 in the Korean Intellectual Property Office, the disclosure of which is incorporated herein in its entirety by reference.

SUMMARY

Embodiments provide a hard disk drive (HDD) which may reduce a phenomenon in which a read/write head hits the outer diametric area of a disk by preventing a flux fringe effect and thus reducing a bending torque acting on a voice coil even when a double magnet is in use, or particularly a single magnet is in use.

According to an aspect of an exemplary embodiment, there is provided a hard disk drive including a head stack assembly comprising an actuator arm, a voice coil coupled to a bobbin, and a pivot shaft holder, rotatably coupled to a pivot shaft, disposed between the actuator arm and the voice coil; at least one magnet, disposed adjacent to the voice coil, which interacts with the voice coil when current flows in the voice coil, thus generating an electromagnetic force to pivot the actuator arm around the pivot shaft, and a flux fringe prevention layer comprising a magnetic material and coupled to the voice coil, to prevent magnetic flux generated in the magnet being bent in the voice coil.

The voice coil may have a closed loop cross-sectional shape, and the voice coil may include a first portion adjacent to the pivot shaft holder, a third portion opposite the first portion, and a pair of second portions each connecting an end of the first portion to an end of the third portion, thus forming the closed loop shape.

The first portion of the voice coil may have a V-shaped cross-sectional shape.

The flux fringe prevention layer may include an upper layer coupled to an upper surface of the voice coil.

The flux fringe prevention layer may further include a lower layer coupled to a lower surface of the voice coil.

The flux fringe prevention layer may include an inner layer disposed between upper and lower layers of the voice coil.

The flux fringe prevention layer may further include an upper layer coupled to an upper surface of the voice coil.

The flux fringe prevention layer may include a plurality of pieces, each of which is coupled to the voice coil, wherein each of the plurality of pieces is separated from each other of the plurality of pieces and wherein the voice coil includes at least one corner region to which none of the plurality of pieces is coupled.

The flux fringe prevention layer may be adhesively coupled to the voice coil.

The flux fringe prevention layer may comprise at least one ferromagnetic material selected from a group consisting of pure steel, permalloy, sendust, ferrite, SPCC, nickel (Ni), and cobalt (Co).

The at least one magnet may be a single magnet disposed above and separated from the voice coil.

BRIEF DESCRIPTION OF THE DRAWINGS

The above and/or other aspects will be more clearly understood from the following detailed description of exemplary embodiments taken in conjunction with the accompanying drawings in which.

DETAILED DESCRIPTION OF EXEMPLARY EMBODIMENTS

The attached drawings are referred to in order to gain a sufficient understanding of embodiments and the merits thereof. Hereinafter, embodiments will be described in detail with reference to the attached drawings. Like reference numerals in the drawings denote like elements.

The present disclosure relates to a hard disk drive, and more particularly, to a HDD capable of preventing a flux fringe effect so that a phenomenon in which a read/write head hits the outer diametric area of a disk due to bending torque acting on a voice coil may be reduced.

HDDs are data storage devices capable of recording data on a disk or reproducing data stored on the disk by changing digital electro pulse having data information to permanent magnetic field. HDDs are widely used as an auxiliary memory devices for computer systems because of their fast access time to a large amount of data.

In general, an HDD includes a disk for recording data, a spindle motor for rotating the disk, a head stack assembly (HSA) including an actuator arm on which a read/write head to write data to the disk and read data from the disk is mounted, a voice coil motor (VCM) for pivoting the actuator arm to move the read/write head to a desired position on the disk, and a base on which the above elements are installed.

The VCM includes a bobbin provided at the rear end portion of a pivot shaft of the actuator arm, a VCM yoke concentrating scattered magnetic flux in a particular direction, a magnet installed on the VCM yoke and generating a magnetic field, and a voice coil wound around the bobbin and generating an electromotive force by receiving current in the magnetic field.

In the above-described configuration, as current is applied to the VCM coil located between magnets, a force is generated and applied to the bobbin so that the bobbin may pivot. Accordingly, the actuator arm extending in a direction opposite to the bobbin from a pivot shaft holder is pivoted. Thus, the read/write head supported on an end portion of the actuator arm moves across the disk that is rotating in a radial direction. While doing so, the read/write head seeks and accesses a track so that accessed information may be signal processed.

Although a double magnet may be generally used for the VCM, a single magnet may be used because production costs can be reduced. However, when the single magnet is used for the VCM, a flux fringe effect in which part of the magnetic flux generated in the magnets is bent in the air may be generated.

Figure 1:
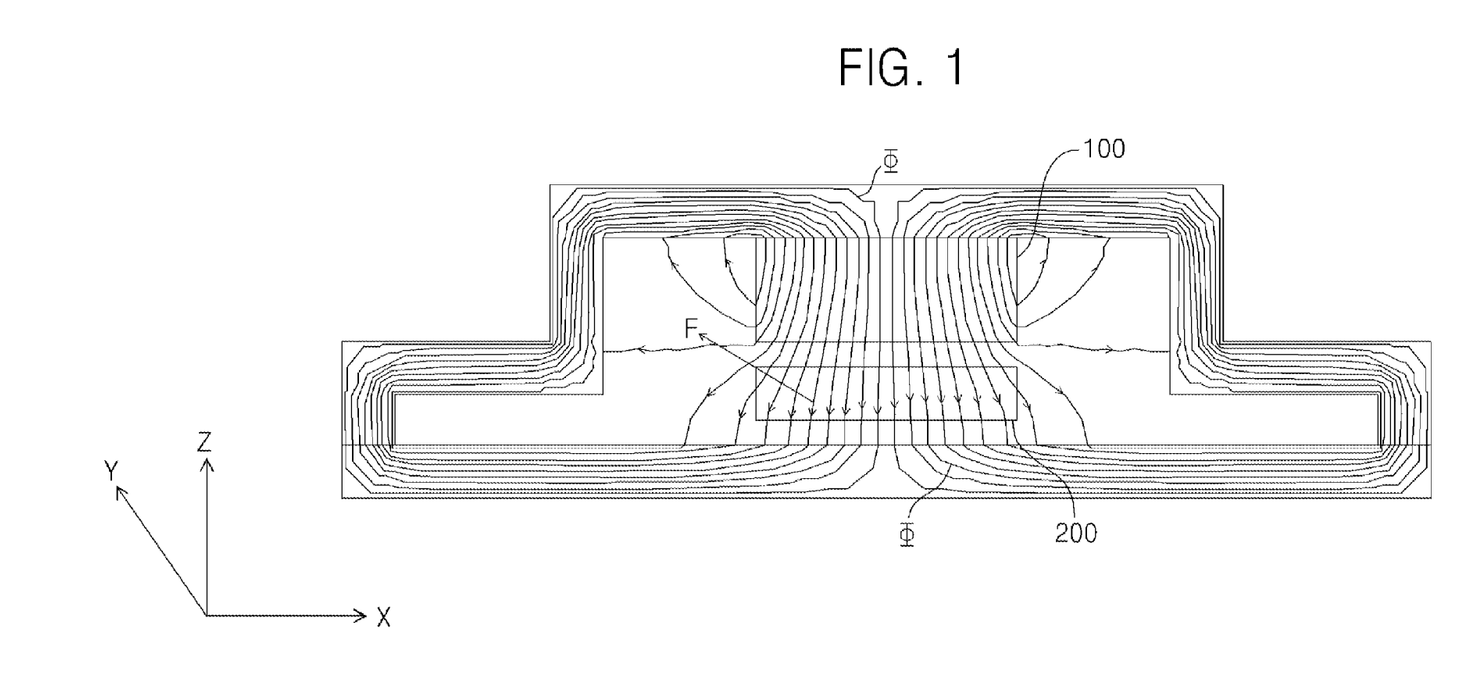
FIG. 1 illustrates an example of a distribution of lines of magnetic force obtained through magnetic field analysis.

In detail, FIG. 1 shows an example of the distribution of magnetic force lines obtained from the magnetic field analysis. Referring to FIG. 1, magnetic flux Φ generated in a magnet 100 is transferred to a voice coil 200 in a direction –Z and forms a constant closed loop. In this case, the magnetic flux Φ is constantly bent in the air, which is referred to the flux fringe effect. The flux fringe effect is generated further in the outer side of the voice coil 200.

When current flows in the voice coil 200, a force F is applied to the voice coil 200 according to the Fleming's left hand rule. Accordingly, bending torque is generated in the voice coil 200.

When the single magnet is in use, a relatively large bending torque is generated in the voice coil 200 due to the flux fringe effect so that a vibration resonance phenomenon may be generated in the outer diameter or inner diameter of a disk. In particular, the read/write head may hits the disk at the outer diameter of the disk due to the bending torque so that lots of defects may be generated during a manufacturing process.

Figure 2:
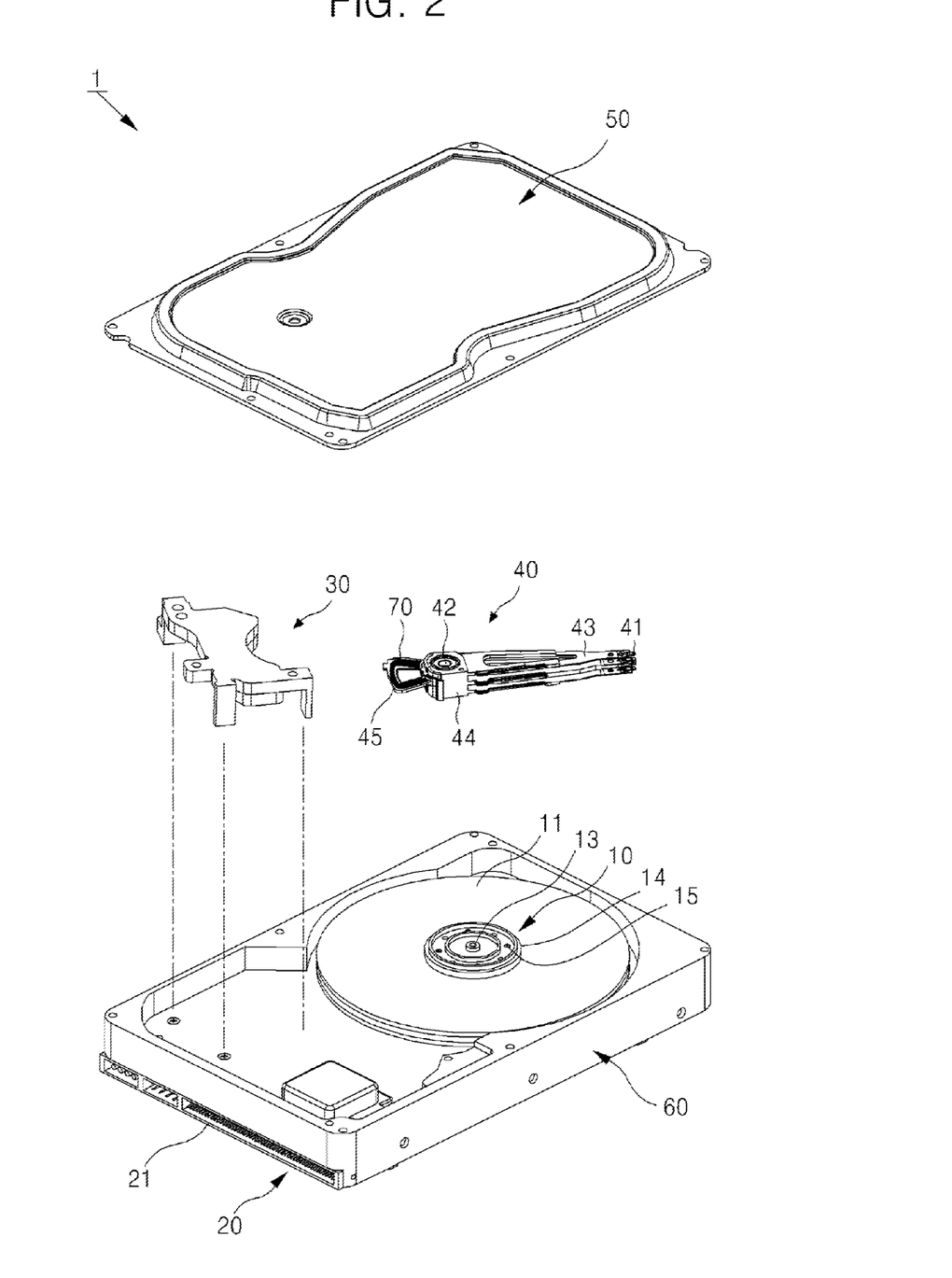
FIG. 2 is an exploded perspective view of an HDD according to an exemplary embodiment, in which major parts are disassembled.
Figure 3:
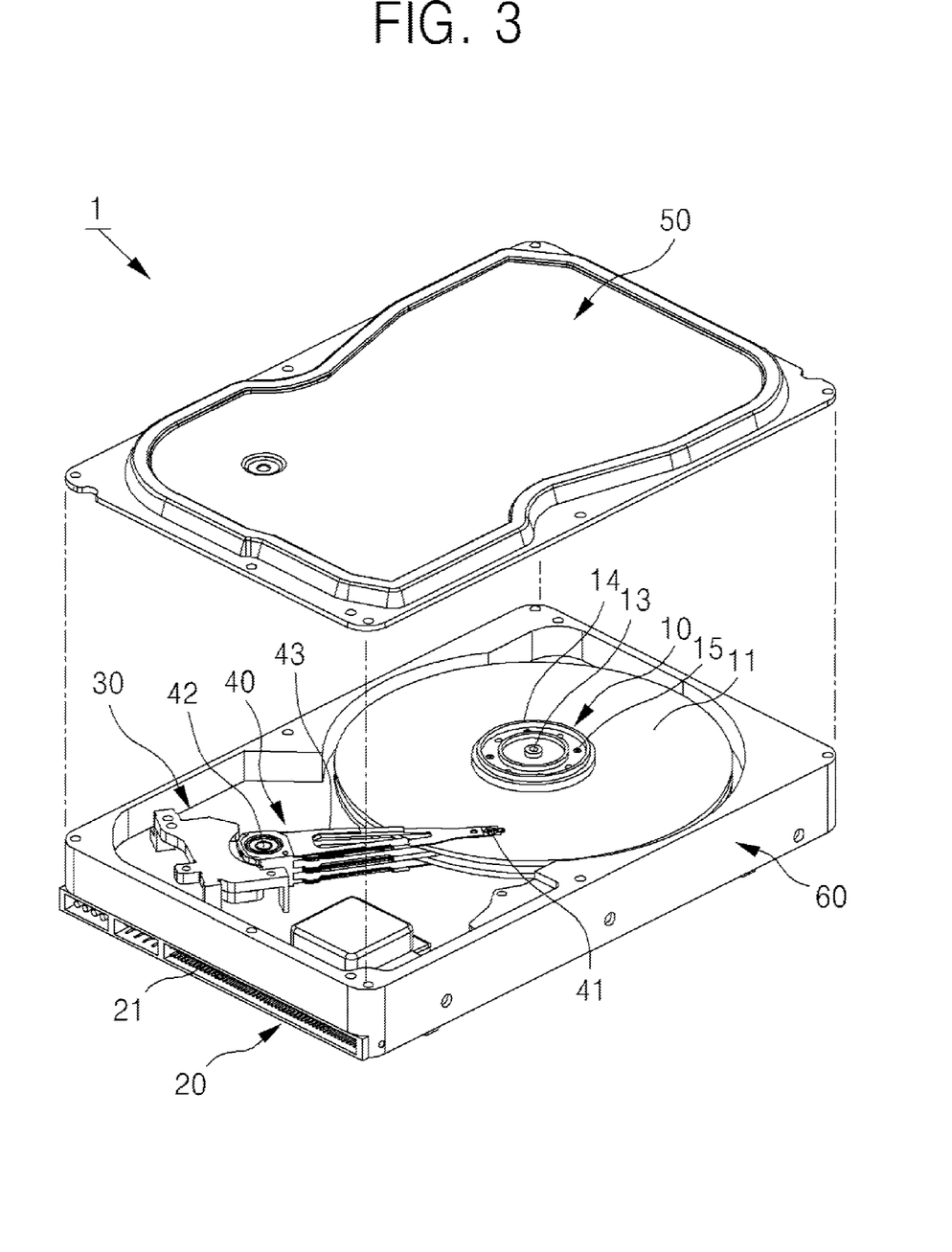
FIG. 3 is a perspective view showing that the major parts of the HDD of FIG. 2 are assembled.
Figure 4:
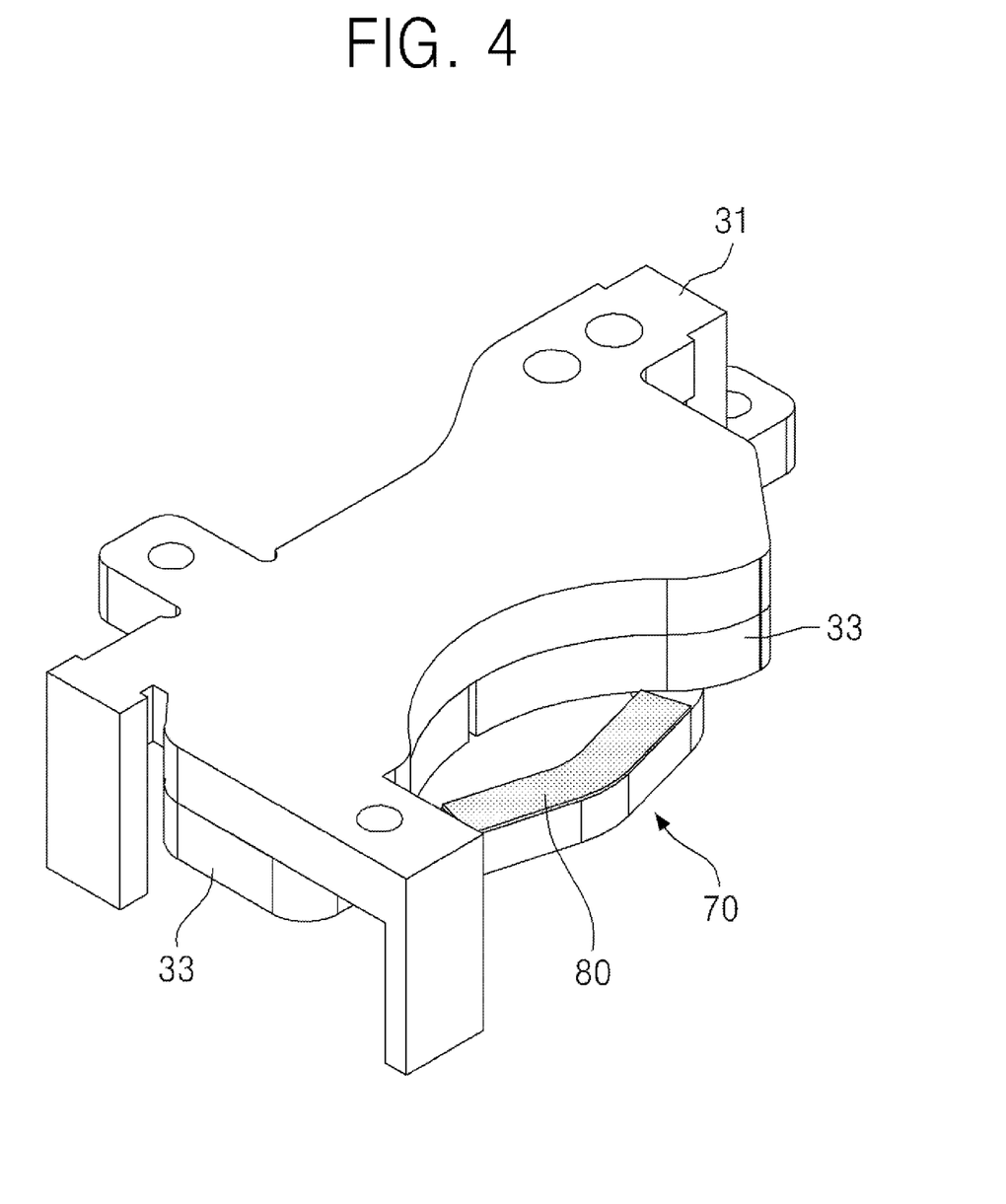
FIG. 4 is an enlarged view of the VCM yoke, the magnet, and the voice coil of the HDD of FIG. 2.
Figure 5:
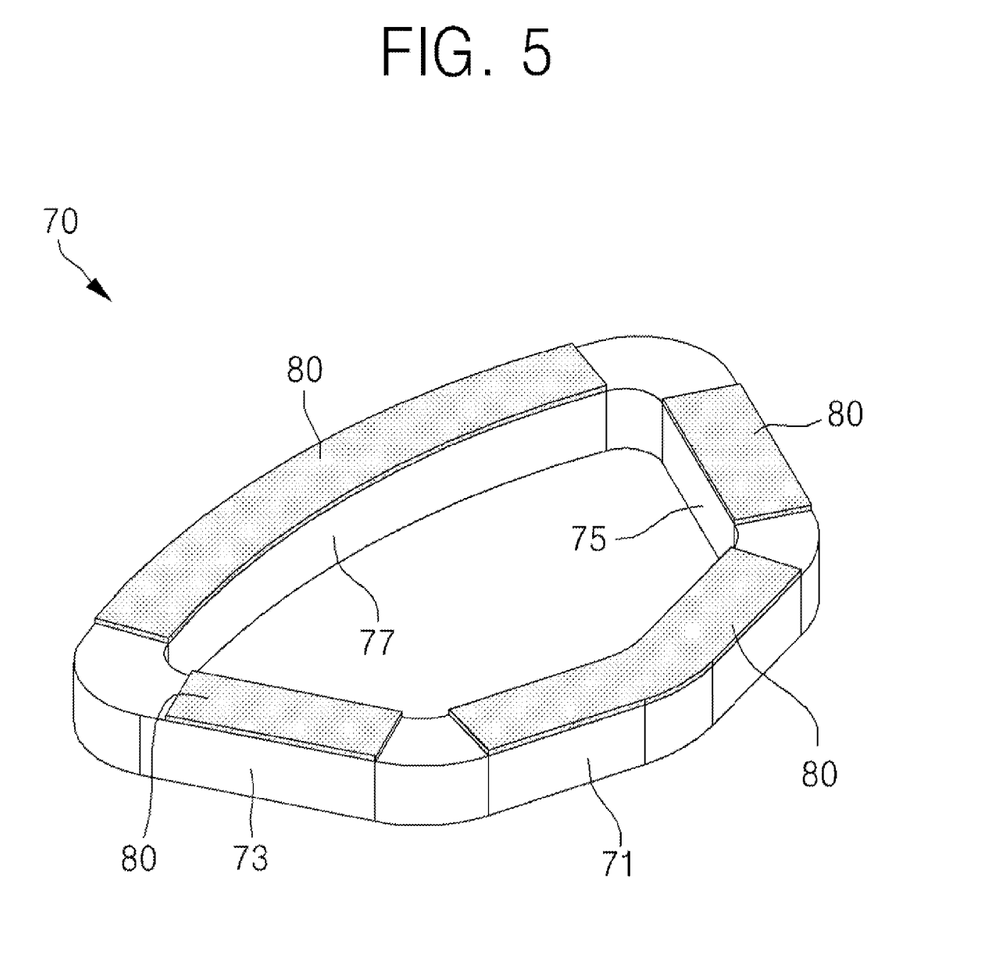
FIG. 5 is an enlarged view of the voice coil of the HDD of FIG. 2.

FIG. 2 is an exploded perspective view of a hard disk drive (HDD) according to an exemplary embodiment, in which major parts are disassembled. FIG. 3 is a perspective view showing in which the major parts of the HDD of FIG. 2 are assembled. FIG. 4 is an enlarged view of the VCM yoke, the magnet, and the voice coil of the HDD of FIG. 2. FIG. 5 is an enlarged view of the voice coil of the HDD of FIG. 2.

Referring to FIGS. 2 to 5, an HDD 1 according to an exemplary embodiment includes a disk pack 10 having a disk 11, a printed circuit board assembly (PCBA) 20, a head stack assembly (HSA) 40 having a read/write head 41 mounted on an end portion thereof and a bobbin 45, around which a voice coil motor (VCM) coil 70 is wound, provided at the other end portion thereof, a voice coil motor (VCM) 30 for pivoting the HSA 40, a cover 50, a base 60, and a flux fringe prevention layer 80 formed of a magnetic material and coupled to the voice coil 70 to reduce bending torque applied to the voice coil 70 due to a magnetic force of an out-of-phase component that is generated as magnetic flux generated by magnets 33 is bent in the voice coil 70.

The above-described constituent elements are installed on the base 60 and the cover 50 is coupled to the base 60 to protect the constituent elements on the base 60.

The disk pack 10 includes a plurality of disks 11 arranged in a vertical direction, a shaft 13 forming a rotation center of the disks 11, a spindle motor hub (not shown) provided radially outside the shaft 13 and supporting the disks 11, a spindle motor (not shown) rotating the spindle motor hub, a clamp 14 coupled to an upper portion of the spindle motor hub, and a clamp screw 15 pressing the clamp 14 to fix the disks 11 to the spindle motor hub.

The PCBA 20 includes a printed circuit board (PCB; not shown) having a plate shape and coupled to a lower portion of the base 60, a flexible printed circuit board (FPCB; not shown) installed on an upper surface of the base 60 close to the HSA 40 and electrically connecting the HSA 40 and the PCB, and a PCB connector 21 provided at a side of the PCB. A plurality of chips and circuits (not shown) to control the disk pack 10, the HSA 40, and the VCM 30 are provided on the PCB and communicate signals with an external device by using the PCB connector 21.

The HSA 40 is a carrier for recording data on the disk 11 or reproducing the written data from the disk 11. The HSA 40 includes the read/write head 41 to write data to the disk 11 or read the written data, the actuator arm 43 pivoting around a pivot shaft 42 across the disk 11 so that the read/write head 41 may access data on the disk 11, a pivot shaft holder 44 rotatably supporting the pivot shaft 42 and supporting the actuator arm 43 that is coupled thereto, and the bobbin 45 provided at the opposite side of the actuator arm 43 with respect to the pivot shaft holder 44 to be integrally with the actuator arm 43.

The read/write head 41 reads or writes information with respect to the disk 11 that is rotating, respectively, by sensing a magnetic field formed on the surface of the disk 11 or magnetizing the surface of the disk 11. The read/write head 41 for reading and writing data includes a read head (not shown) for sensing the magnetic field of the disk 11 and a write head (not shown) for magnetizing the disk 11.

The VCM 30 is a type of driving motor that pivots the actuator arm 43 of the HSA 40 to move the read/write head 41 to a desired position on the disk 11. The VCM 30 includes a VCM yoke 31 having the magnet 33 and a voice coil 70 arranged at the bobbin 45 under the VCM yoke 31. The VCM 30 utilizes Fleming's left hand rule. That is, when current is applied to a conductive body existing in a magnetic field, an electromagnetic force is generated. As current is applied to the VCM coil 70 located between the magnet 33, a force is generated and applied to the bobbin 45 to pivot the bobbin 45. Accordingly, as the actuator arm 43 pivots in a predetermined direction, the read/write head 41 mounted at the end portion of the actuator arm 43 may move in a radial direction of the disk 11 that is rotating, and simultaneously search and access a desired track (not shown). Thus, the data may be recorded on the disk 11 or the recorded data may be reproduced from the disk 11.

The VCM yoke 31, to allow the magnetic flux generated by the magnets 33 to concentrate in a predetermined and constant direction, is manufactured of pure steel having a high magnetic permeability. Although the HDD 1 of the present embodiment adopts a single magnet in which the magnet 33 are installed only on the lower portion of the VCM yoke 31, the embodiments are not limited thereto. The inventive concept of the may be applied to a double magnet in which the magnets 33 are installed on each of the lower surface of an upper VCM yoke (not shown) and the upper surface of a lower VCM yoke (not shown), the upper and lower VCM yokes being vertically separated from each other.

The voice coil 70 of the present exemplary embodiment, as illustrated in FIGS. 4 and 5, includes a first portion 71 provided close to the pivot shaft holder 44, a pair of second portions 73 and 75 coupled to both end portions of the first portion 71, and a third portion 77 connecting end portions of the second portions 73 and 75, which form a closed loop shape as a whole.

The first portion 71, as illustrated in FIG. 5, has a V-shaped cross section. The second portions 73 and 75 are coupled to both end portions of the first portion 71. The third portion 77 has a curved cross sectional shape to connect the end portions of the second portions 73 and 75

In the voice coil 70 of the present exemplary embodiment, the cross section of the first portion 71 has a V shape. Accordingly, as the cross sectional shape of the first portion 71 is V-shaped, a magnetic force acting on this portion is reduced so that bending torque may be reduced.

The flux fringe prevention layer 80 restricts bending of a magnetic flux generated by the magnets 33 in the voice coil 35 so that bending torque acting on the voice coil 35 due to a flux fringe effect may be reduced.

In the present exemplary embodiment, the flux fringe prevention layer 80 is intermittently provided on the upper surface of a portion excluding a corner portion of the voice coil 70 along the closed loop of the voice coil 70. That is, as illustrated in FIG. 5, the flux fringe prevention layer 80 is a steel layer that is a thin ferromagnetic material and adhesively coupled to the upper surfaces of the first portion 71, the second portions 73 and 75, and the third portion 77, except for the corner portions of the voice coil 70. Since the flux fringe prevention layer 80 prevents the magnetic flux from being bent in the air, the bending torque acting on the voice coil 70 is reduced.

In the present exemplary embodiment, the flux fringe prevention layer 80 is not adhesively coupled to the corner portion of the voice coil 70. This is because, when the flux fringe prevention layer 80 is adhesively coupled to the corner portion of the voice coil 70, the magnetic force may be undesirably increased and thus the bending torque is increased.

Similarly, the flux fringe prevention layer 80 according to the present exemplary embodiment is adhesively coupled to the upper surface of the voice coil 70 only and not to the side surface of the voice coil 70. This is because, when the flux fringe prevention layer 80 is adhesively coupled to the side surface of the voice coil 70, the magnetic force may be undesirably increased and thus the bending torque is increased.

In the present exemplary embodiment, the flux fringe prevention layer 80 is adhesively coupled to the upper surface of the voice coil 70. Even when the flux fringe prevention layer 80 is adhesively coupled to the lower surface of the voice coil 70, the bending torque may be reduced. However, the flux fringe effect is further reduced as the distance between the magnet 33 and the flux fringe prevention layer 80 decreases. Thus, it is more effective to adhesively couple the flux fringe prevention layer 80 to the upper surface of the voice coil 70 than to the lower surface thereof.

Also, as the thickness of the flux fringe prevention layer 80 increases, the bending torque is further decreased. Thus, it is more effective to increase the thickness of the flux fringe prevention layer 80 within an allowable range of space.

The flux fringe prevention layer 80 may be manufactured of a ferromagnetic material having a high magnetic permeability such as alloys including Permalloy and Sendust and Ferrite, SPCC base, nickel (Ni), and cobalt (Co), in addition to pure steel. The ferromagnetic material signifies a material that is easily magnetized when no external magnetic field exists. Permalloy is a binary alloy of nickel (Ni) and iron (Fe). Sendust is a ternary alloy of silicon (Si), aluminum (Al), and iron (Fe). Ferrite is a binary alloy of nickel (Ni) and zinc (Zn). An SPCC base is grade of cold rolled mild steel base referenced in the Japanese standard JIS G 3141.

When, as in the present exemplary embodiment, the cross sectional shape of the first portion 71 of the voice coil 70 is a V and the flux fringe prevention layer 80 is adhesively coupled to the upper surfaces of the first portion 71, the second portions 73 and 75, and the third portion 77, except for the corner portions of the voice coil 70, the bending torque acting on the voice coil 70 is much reduced compared to a case in which the flux fringe prevention layer 80 is adhesively coupled to a voice coil in which the cross section of the first portion 71 of the voice coil 70 has a general voice coil shape, not in a V shape, which will be described later after other exemplary embodiments are described below.

Figure 6:
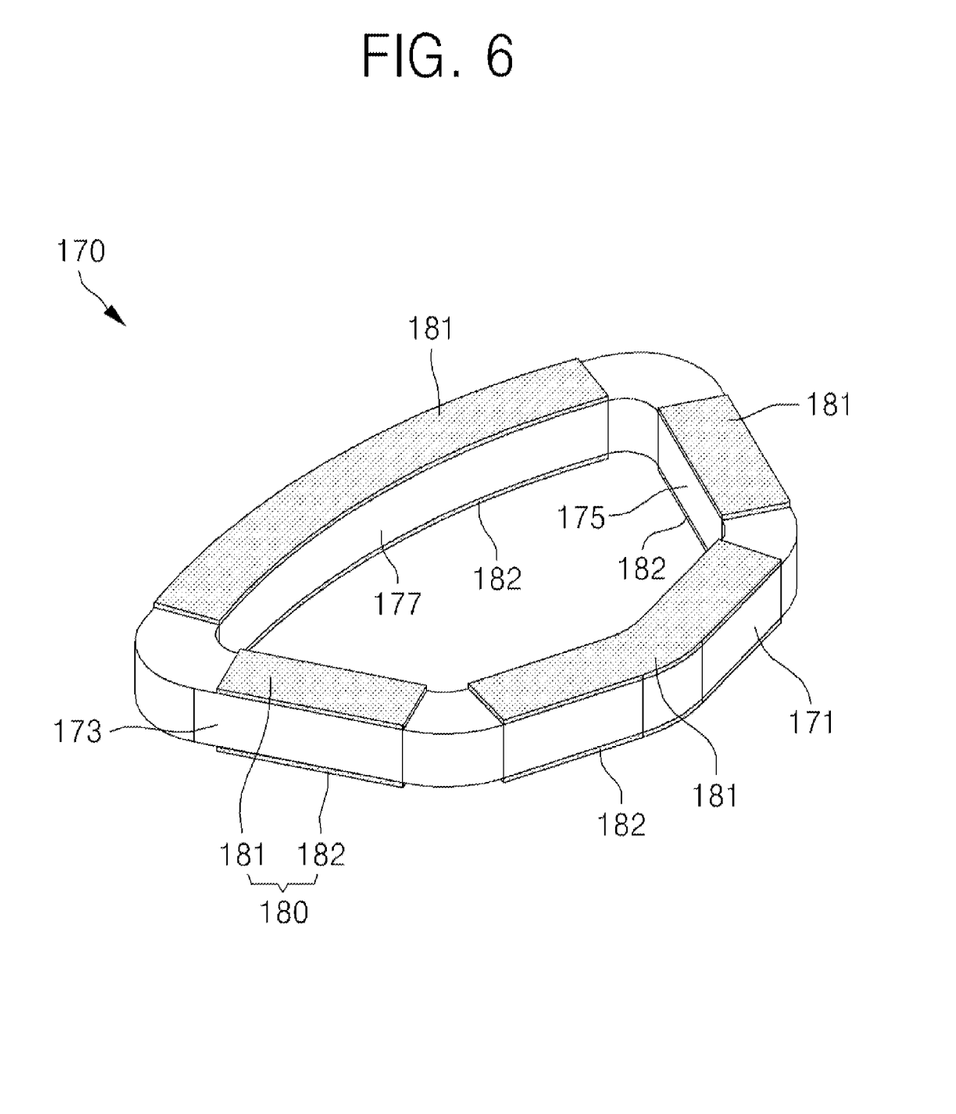
FIG. 6 is a perspective view of a voice coil of an HDD according to another exemplary embodiment.

FIG. 6 is a perspective view of a voice coil 170 of an HDD according to another embodiment. For convenience of explanation, the same constituent elements as those of the HDD according to the above-described embodiment will be omitted herein.

Referring to FIG. 6, a flux fringe prevention layer 180 according to the present embodiment includes an upper layer 181 coupled to the upper surface of the voice coil 170 and a lower layer 182 coupled to a lower surface of the voice coil 170. The upper layer 181 is intermittently provided along a closed loop of the voice coil 170 on the upper surfaces of a first portion 171, a pair of second portions 173 and 175, and a third portion 177, except for the corner portions of the voice coil 170. The lower layer 182 is intermittently provided along a closed loop of the voice coil 170, to be symmetrical to the upper layer 181, on the lower surfaces of the first portion 171, the second portions 173 and 175, and the third portion 177, except for the corner portions of the voice coil 170. That is, the flux fringe prevention layer 180 does not contact the upper and lower surfaces of the corner portions.

In the present embodiment, the flux fringe prevention layer 180 is not adhesively coupled to both the corner portions and the side surface of the voice coil 170. This is because, if the flux fringe prevention layer 180 is adhesively coupled to the corner portions or the side surface of the voice coil 170, the magnetic force may be undesirably increased so that the bending torque may be increased, as described above.

Also, since in the voice coil 170 of the present exemplary embodiment the cross section of the first portion 171 has a V shape, the bending torque acting on the voice coil 170 is much reduced compared to a case in which the flux fringe prevention layer 180 is adhesively coupled to a general voice coil that does not have a V-shaped cross section.

Figure 7:
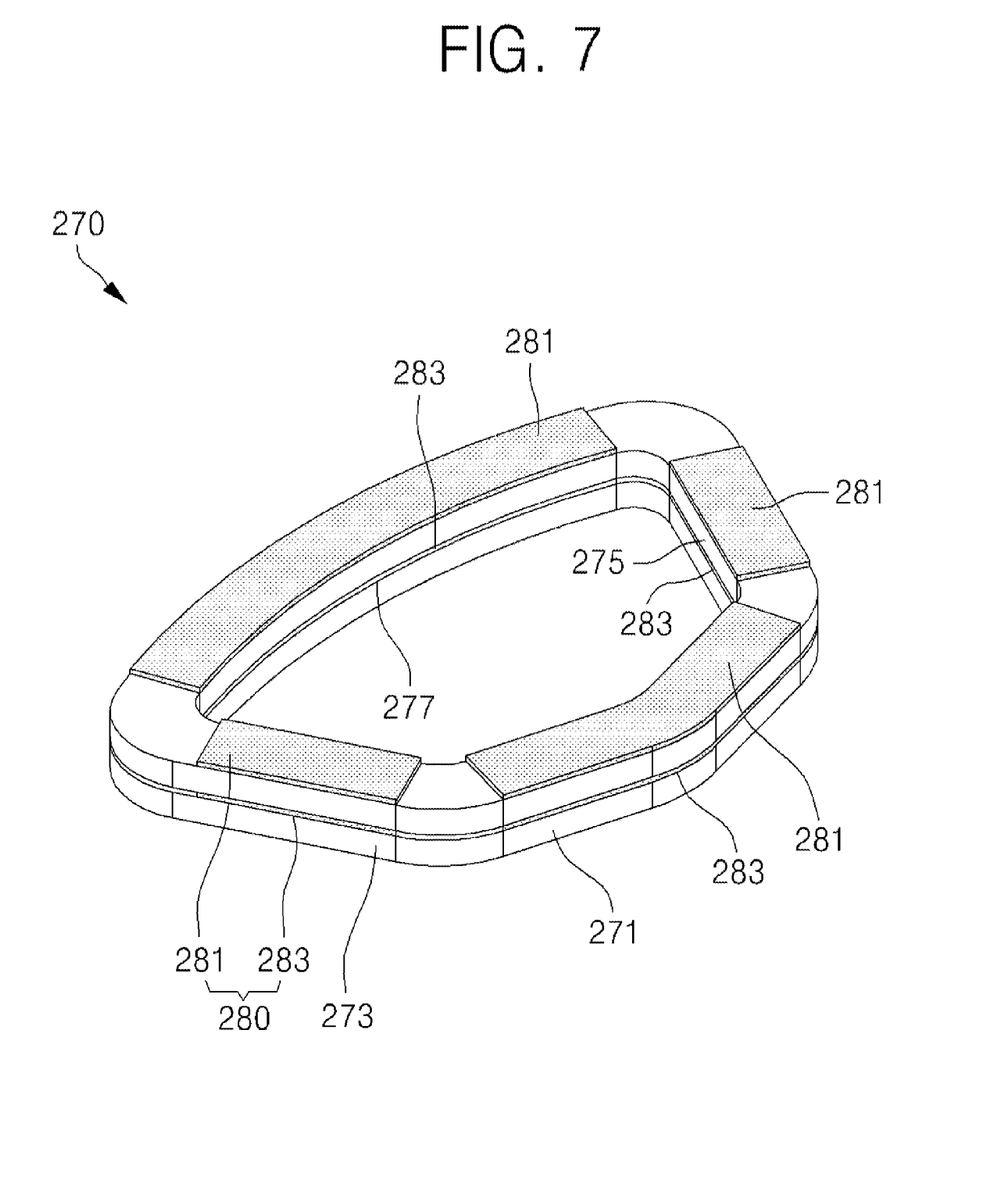
FIG. 7 is a perspective view of a voice coil of an HDD according to another exemplary embodiment.

FIG. 7 is a perspective view of a voice coil 270 of an HDD according to another exemplary embodiment. For convenience of explanation, the same constituent elements as those of the voice coil 70 of the HDD of FIG. 5 will be omitted herein.

Referring to FIG. 7, a flux fringe prevention layer 280 according to the present embodiment includes an upper layer 281 coupled to the upper surface of the voice coil 270 and an inner layer 283 coupled to the interior of the voice coil 270. The upper layer 281 is intermittently provided along a closed loop of the voice coil 270 on the upper surfaces of a first portion 271, a pair of second portions 273 and 275, and a third portion 277, except for the corner portions of the voice coil 270. The inner layer 283 is intermittently provided along a closed loop of the voice coil 270, to be symmetrical to the upper layer 281, on the interiors of the first portion 271, the second portions 273 and 275, and the third portion 277, except for the corner portions of the voice coil 270.

In the present embodiment, the flux fringe prevention layer 280 includes the inner layer 283 provided approximately at the middle of the height of the voice coil 270. Compared to the second embodiment in which the flux fringe prevention layer 180 includes the upper layer 181 and the lower layer 182, placing the inner layer 283 at the middle of the height of the voice coil 270 may be more effective in reducing the bending torque. In the magnetic flux distribution, the intermediate position between a base (not shown) and a magnet (not shown) is a position where a horizontal magnetic force component may be most effectively reduced.

Also, in the present exemplary embodiment, the flux fringe prevention layer 280 is not adhesively coupled to both the corner portions and the side surface of the voice coil 270. This is because, if the flux fringe prevention layer 280 is adhesively coupled to the corner portions or the side surface of the voice coil 270, the magnetic force may be undesirably increased so that the bending torque may be increased, as described above.

Also, since in the voice coil 270 of the present exemplary embodiment the cross section of the first portion 271 has a V shape, the bending torque acting on the voice coil 270 is much reduced compared to a case in which the flux fringe prevention layer 280 is adhesively coupled to a general voice coil that does not have a V-shaped cross section, as described above.

Figure 8:
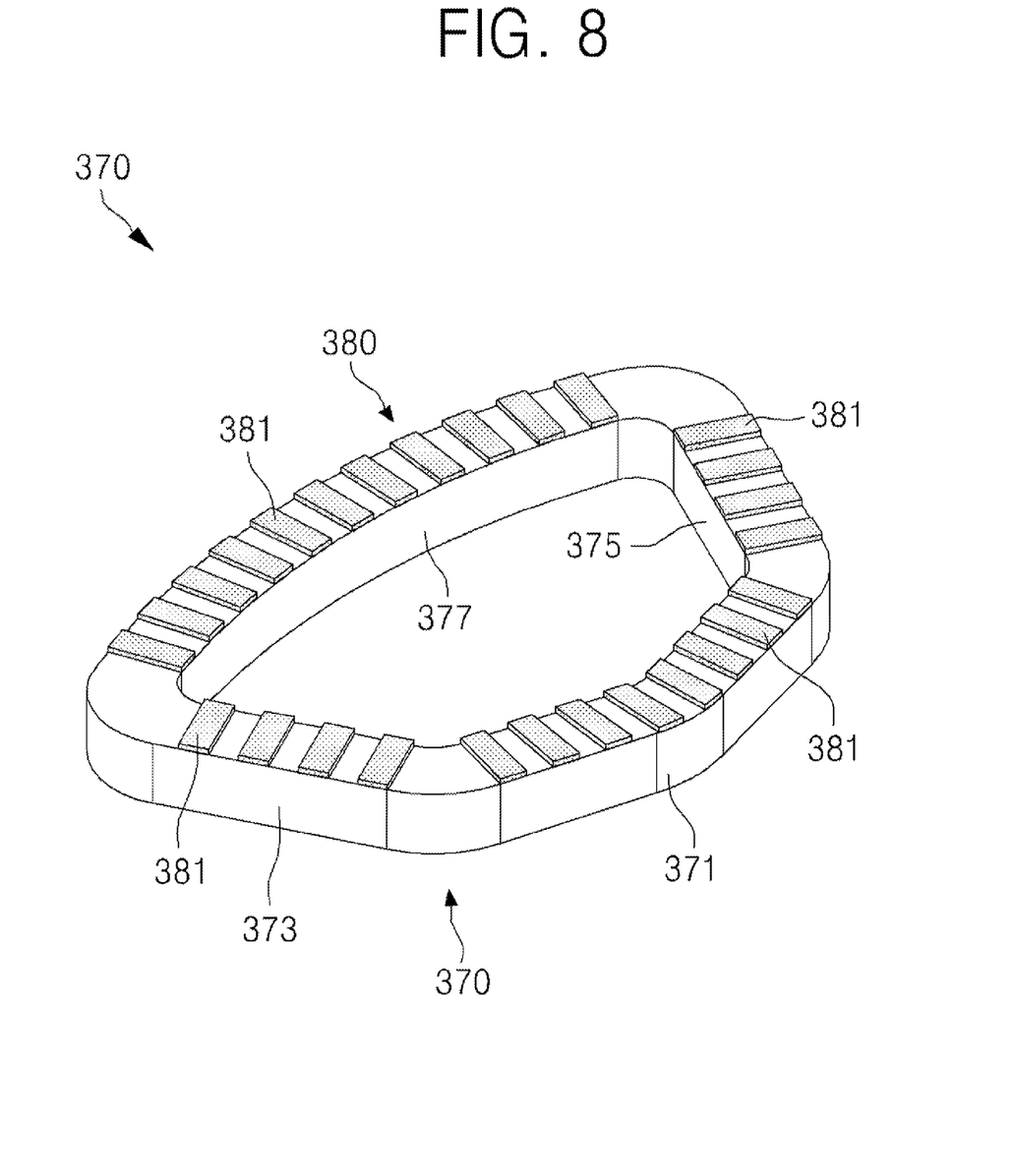
FIG. 8 is a perspective view of a voice coil of an HDD according to another exemplary embodiment.

FIG. 8 is a perspective view of a voice coil 370 of an HDD according to another exemplary embodiment. For convenience of explanation, the same constituent elements as those of the voice coil 70 of the HDD of FIG. 5 will be omitted herein.

Referring to FIG. 8, the flux fringe prevention layer 380 according to the present exemplary embodiment coupled to an upper surface of the voice coil 370 and includes a plurality of flux fringe prevention members 381.

In the present exemplary embodiment, the flux fringe prevention layer 380 is not adhesively coupled to both the corner portions and the side surface of the voice coil 370. This is because, if the flux fringe prevention layer 380 is adhesively coupled to the corner portions or the side surface of the voice coil 370, the magnetic force may be undesirably increased so that the bending torque may be increased, as described above.

Also, since in the voice coil 370 of the present exemplary embodiment the cross section of the first portion 371 has a V shape, the bending torque acting on the voice coil 370 is much reduced compared to a case in which the flux fringe prevention layer 380 is adhesively coupled to a general voice coil that does not have a V-shaped cross section, as described above.

The flux fringe prevention layer 380 is intermittently provided along a closed loop of the voice coil 370 on the upper surfaces of a first portion 371, a pair of second portions 373 and 375, and a third portion 377, except for the corner portions of the voice coil 370. However, unlike the above-described exemplary embodiments, the flux fringe prevention layer 380 is provided not as a single plate on each portion, but as a plurality of flux fringe prevention members 381 separately arranged on each portion, thus partially covering the voice coil 370. The present exemplary embodiment may be applied to a case in which the flux fringe prevention layer 380 is adhesively coupled to only the selectively most effective portions excluding the corner portion.

Figure 9:
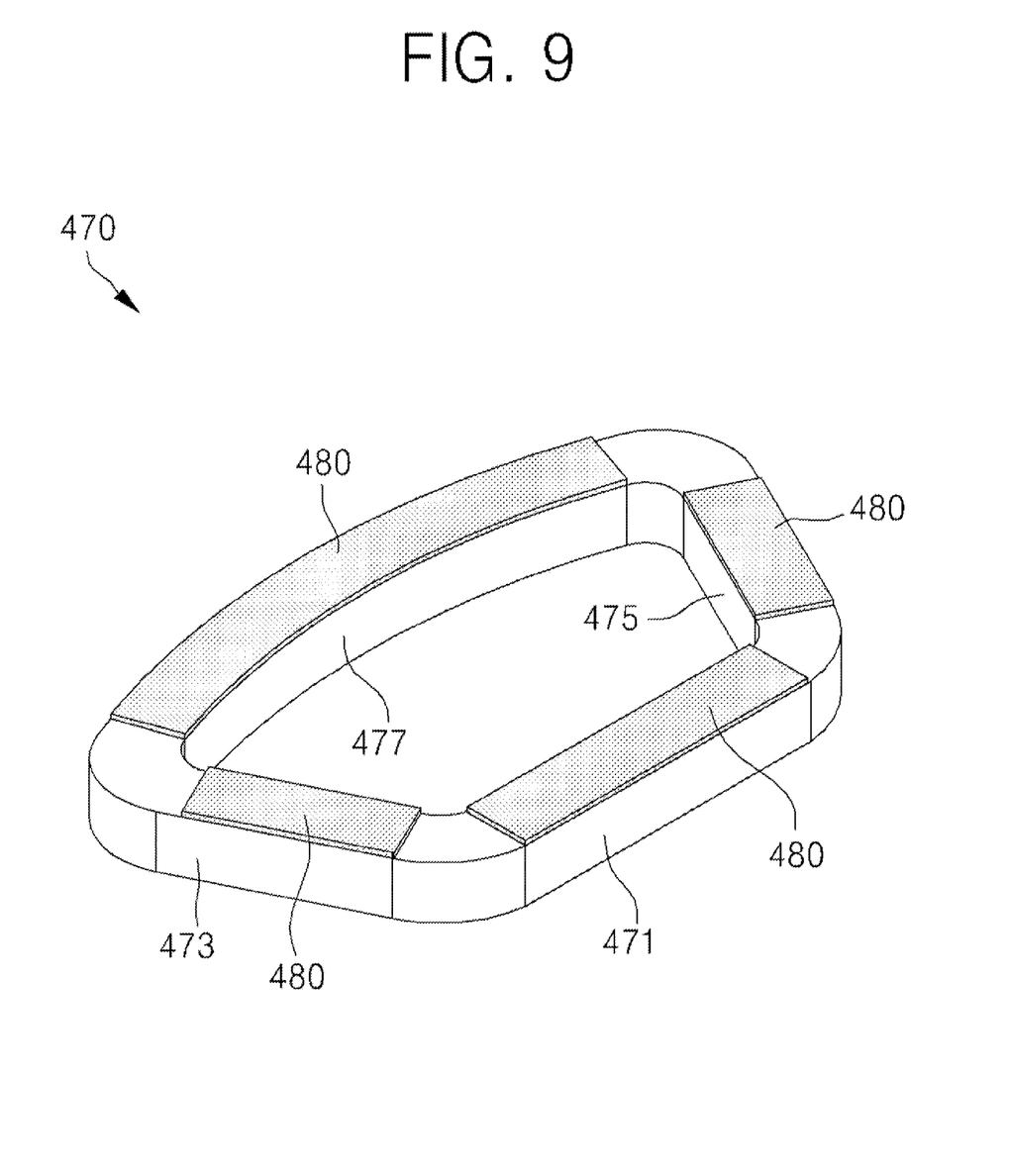
FIG. 9 is a perspective view of a voice coil of an HDD according to another exemplary embodiment.

FIG. 9 is a perspective view of a voice coil 470 of an HDD according to another exemplary embodiment. For convenience of explanation, the same constituent elements as those of the voice coil 70 of the HDD of FIG. 5 will be omitted herein.

Referring to FIG. 9, the voice coil 470 according to the present exemplary embodiment includes a first portion 471, a pair of second portions 473 and 475 coupled to both end portions of the first portion 471 to cross the first portion 471, and a third portion 477 connecting end portions of the second portions 473 and 475.

The first portion 471 of the present exemplary embodiment does not have a V-shaped cross section, but has a linear shape like a general voice coil, unlike the first portion 71 of the voice coil 70 of the HDD of FIG. 5. According to the present exemplary embodiment, a flux fringe effect may be efficiently prevented while using the general voice coil without change.

In the present exemplary embodiment, the flux fringe prevention layer 480 is not adhesively coupled to both the corner portion and the side surface of the voice coil 470. This is because, if the flux fringe prevention layer 480 is adhesively coupled to the corner portion or the side surface of the voice coil 470, the magnetic force may be undesirably increased and thus the bending torque is increased, as described above.

The bending torque acting on the voice coil are described below with respect to an HDD having a voice coil on which the flux fringe prevention layer is not provided, the HDD of FIG. 5, and the HDD of FIG. 9.

Figure 10:
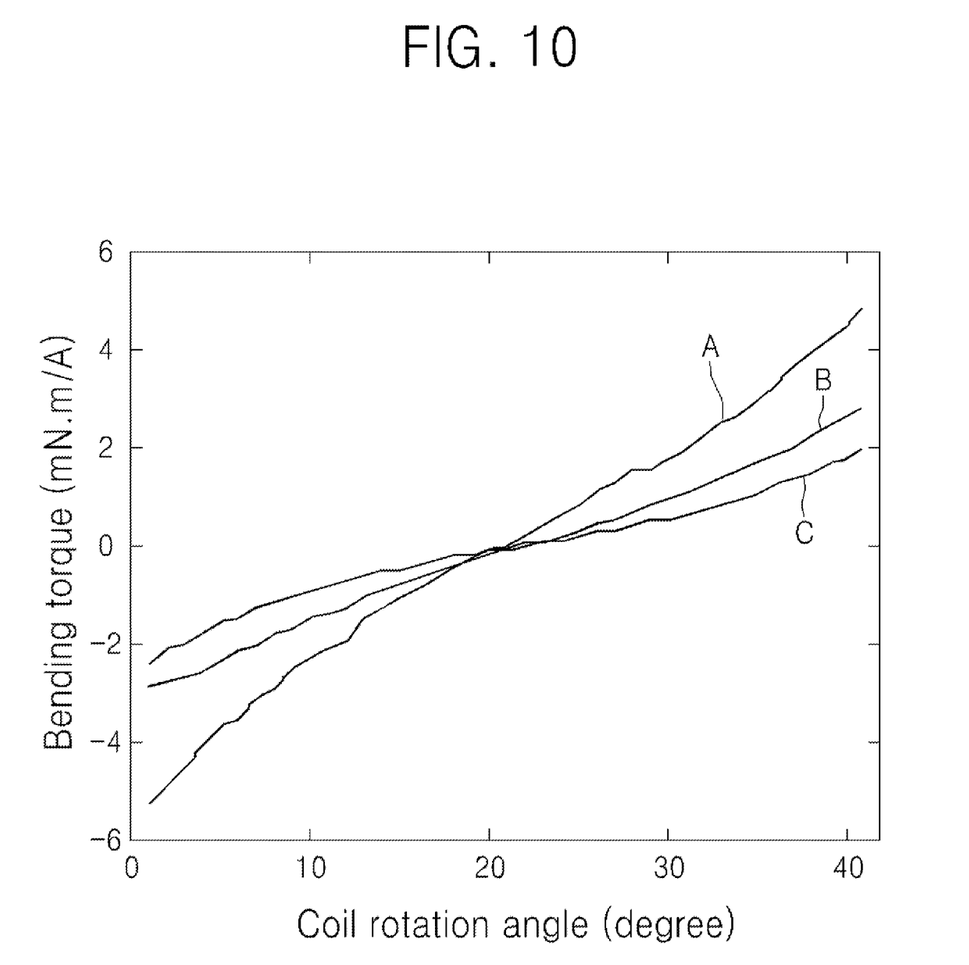
FIG. 10 is a graph showing the comparison of the bending torque acting on a voice coil having no flux fringe prevention layer in an HDD, the voice coil of the HDD of FIG. 5, and the voice coil of the HDD of FIG. 9.

FIG. 10 is a graph showing a comparison of the bending torque acting on a voice coil having no flux fringe prevention layer in an HDD, the voice coil of the HDD of FIG. 5, and the voice coil of the HDD of FIG. 9. In FIG. 10, a line A indicates a bending torque acting on the voice coil of an HDD, a line B indicates a bending torque B acting on the voice coil 470 of the HDD of FIG. 9, and a line C indicates a bending torque C generated from the voice coil 70 of the HDD 1 of FIG. 5.

According to an analysis result, the HDD 1 of FIG. 5 may reduce the bending torque acting on the voice coil 70 by about 70% compared to the bending torque acting on a voice coil (not shown) of an HDD (not shown). Also, the voice coil 470 of the HDD of FIG. 9 may reduce the bending torque by about 50% compared to the bending torque acting on the voice coil of the HDD.

Although it is not illustrated, the flux fringe prevention layer 180 of FIG. 6 may include an inner layer (not shown) in addition to the upper layer 181 and the lower layer 182, if necessary.

As described above, according to the exemplary embodiments, since the flux fringe prevention layer is manufactured of a magnetic material and coupled to the voice coil to prevent the magnetic flux generated by the magnet from being bent in the voice coil, even when a double magnet is in use, or particularly a single magnet is in use, a flux fringe effect may be reduced and thus a bending torque acting on the voice coil is reduced so that the phenomenon in which a read/write head hits the outer diametric area of a disk may be reduced.

While exemplary embodiments been particularly shown and described herein, it will be understood that various changes in form and details may be made therein without departing from the spirit and scope of the following claims.

What is claimed is:

1. A hard disk drive comprising:
   a voice coil coupled to a bobbin provided at the opposite direction of an actuator arm with respect to a pivot shaft holder rotatably supporting a pivot shaft;
   at least one magnet that is disposed adjacent to the voice coil and interacts with the voice coil when current flows in the voice coil, to thereby generate an electromagnetic force to pivot the actuator arm around the pivot shaft; and
   a flux fringe prevention layer that comprises a magnetic material and is coupled to the voice coil, the flux fringe prevention layer preventing a magnetic flux generated in the magnet from being bent in the voice coil.

2. The hard disk drive of claim 1, wherein a cross-section of the voice coil has a closed loop shape, and the voice coil comprises:
   a first portion that is provided adjacent to the pivot shaft holder;
   a third portion that is opposite the first portion; and
   a pair of second portions each connecting an end of the first portion to an end of the third portion, thereby forming the closed loop shape.

3. The hard disk drive of claim 2, wherein a cross-section of the first portion of the voice coil has a V-shape.

4. The hard disk drive of claim 1, wherein the flux fringe prevention layer comprises an upper layer coupled to an upper surface of the voice coil.

5. The hard disk drive of claim 4, wherein the flux fringe prevention layer further comprises a lower layer coupled to a lower surface of the voice coil.

6. The hard disk drive of claim 1, wherein the flux fringe prevention layer comprises an inner layer coupled to the interior of the voice coil.

7. The hard disk drive of claim 6, wherein the flux fringe prevention layer further comprises an upper layer coupled to an upper surface of the voice coil.

8. The hard disk drive of claim 1, wherein the flux fringe prevention layer is provided in a plurality of pieces which are coupled to the voice coil, except to a corner portion of the voice coil, by being separated from each other and along the closed loop.

9. The hard disk drive of claim 1, wherein the flux fringe prevention layer is adhesively coupled to the voice coil.

10. The hard disk drive of claim 1, wherein the flux fringe prevention layer comprises one or more ferromagnetic materials selected from a group consisting of pure steel, permalloy, sendust, ferrite, SPCC, nickel, and cobalt.

11. The hard disk drive of claim 1, wherein the at least one magnet is a single magnet disposed above and separated from the voice coil.

* * * * *